United States Patent

[11] 3,577,747

| [72] | Inventor | James Murrell Brown<br>Box 1388, Levelland, Tex. 79336 |
|---|---|---|
| [21] | Appl. No. | 833,955 |
| [22] | Filed | June 17, 1969 |
| [45] | Patented | May 4, 1971 |

[54] TORQUE LIMITING CLUTCH
3 Claims, 2 Drawing Figs.

[52] U.S. Cl. ............................................. 64/29
[51] Int. Cl. ............................................. F16d 7/00
[50] Field of Search ............................................. 64/29; 192/56

[56] References Cited
UNITED STATES PATENTS

| 681,476 | 8/1901 | Flautt | 64/29 |
| 1,126,219 | 1/1915 | Hupp | 64/29 |
| 1,911,507 | 5/1933 | Hitchcock | 64/29 |
| 2,167,749 | 8/1939 | Grohn | 192/56 |
| 2,733,622 | 2/1956 | Evans | 192/56X |

*Primary Examiner*—Allan D. Herrmann
*Attorney*—Charles W. Coffee

ABSTRACT: A self-aligning, adjustable torque-limiting clutch has a can-shaped body which is attached to the driving shaft. A bolt is attached to the driven shaft and the bolt extends through the body and journaled at each end thereof for alignment support. One serrated plate is attached to the body and another serrated plate to the bolt and the serrated plates are held together by a compression spring inside the body, acting against an adjustable nut on the bolt.

PATENTED MAY 4 1971

3,577,747

INVENTOR:
JAMES MURRELL BROWN
BY:
C. M. McAfee
Atty.

TORQUE LIMITING CLUTCH

BACKGROUND OF THE INVENTION

1. Field of the Invention

This invention relates to machine elements, flexible shaft coupling, and more particularly to overload release of aligned rotary elements.

2. Description of the Prior Art

Other workers in the field have considered the problem, but it appears that none of the workers were able to solve the problem of having a self-aligned, adjustable clutch with safe guards against tampering and, also, provisions for keeping excess dirt from the clutch, Examples of prior work in this field are U.S. Pat. No. 2,209,155, and U.S. Pat. No. 2,452,142,

SUMMARY OF THE INVENTION

The clutch of my invention was particularly designed to be used upon a truck for oil field work. A positive displacement pump, such as a gear pump, is driven from the power takeoff shaft of the truck. Because of the nature of the work, the pump is often overloaded or locked down. The pump might lock down because of foreign material in the impellers of the pump. The pump might be overloaded when attempting to pump too much fluid at too high pressures. In either event the overloading or locking down of the pump will cause damage to the truck transmission, often in the form of breaking the transmission housing.

To solve this problem, I designed an overload clutch which may be attached to the pump shaft and is unsupported, except for its attachments to the pump shaft at one end and a tumbler shaft at the other. The tumbler shaft is a shaft having a slip joint and universal joints so that the pump may move relative to the transmission of the truck inasmuch as one is mounted to the engine and the other is mounted to the frame of the truck. Furthermore, this mechanism is located under the truck where it is exposed to mud and dust. Rocks and stones thrown by the tires of the truck may strike the clutch. I designed all exposed parts to be sturdy enough to withstand damage from blows of small stones.

Also, I provided a clutch which may be adjusted to transmit sufficient torque to operate the pump in normal operation. However, the adjustment is not readily exposed. The temperment of the operators of this type of equipment is such that if equipment is easily adjustable, they will tighten the adjustment anytime the clutch slips; therefore, destroying its usefulness in protecting the transmission.

The clutch I designed, specifically includes an adjusting nut on the threaded shaft, which is located within a cover, the cover transmitting the torque from the driving end into a serrated plate. There are a pair of serrated plates mated together and held together with a spring. However, the spring and the threads of the bolt upon which the nut operates are located within the cover and, therefore, are protected from excessive dirt and small flying objects. The nut is adjustable by loosening a setscrew through a hole in the cover, yet it is not subject to tampering because a certain amount of time is required to disengage capscrews so that the bolt may be turned within the cover. Therefore, it achieves the objective of being adjusted without complete removal and disassembly.

An object of this invention is to protect a drive transmission from being overloaded.

Another object is to provide a torque-limiting clutch.

Another object is to achieve the above with an adjustable clutch protected from tampering.

Other objects are to achieve the above with a device that is sturdy, compact, durable, lightweight, simple, safe, efficient, versatile, and reliable, yet inexpensive and easy to manufacture, install, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
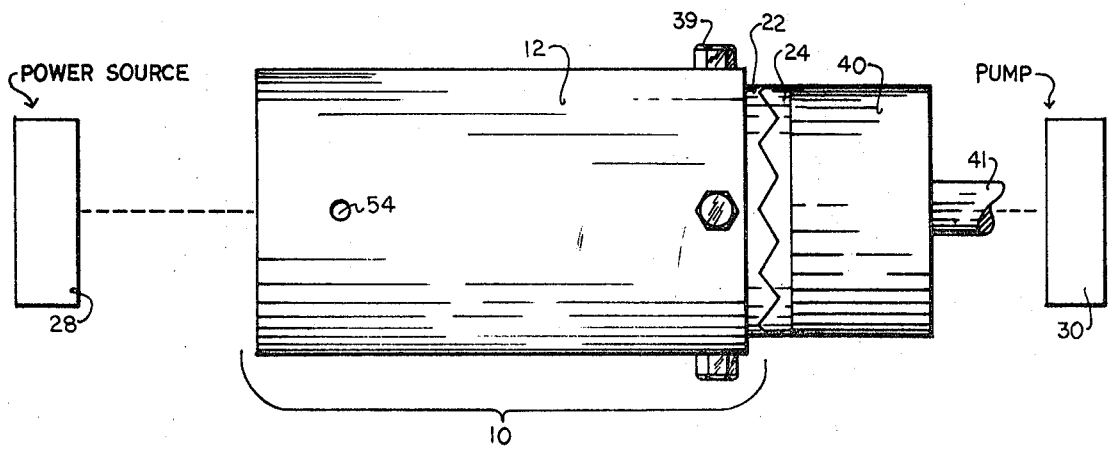
FIG. 1 is a side-elevational view of an embodiment of my invention with associated parts shown schematically.
Figure 2:
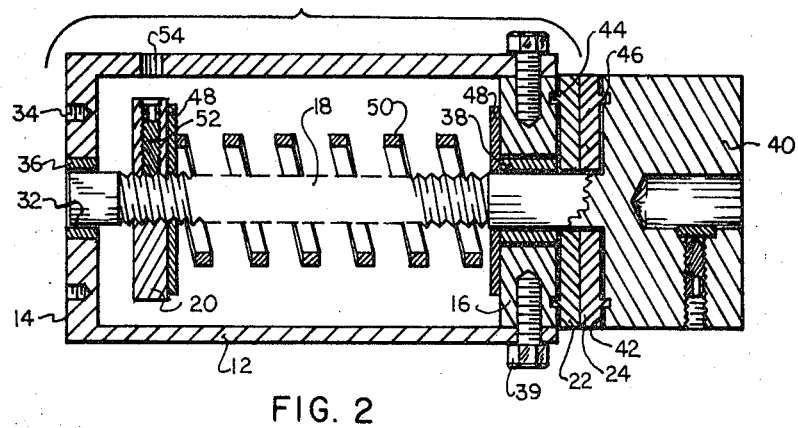
FIG. 2 is an axial sectional view thereof.

The major parts of the clutch have been designed as body 10, which includes cylindrical, tubular cover 12 with integral driving disc 14 on one end and spring disc 16 on the other. Bolt 18 is telescoped within the body 10 and has nut 20 threaded onto the bolt within the cover 12. There are two serrated plates: serrated body plate 22 attached to the body 10 and serrated bolt plate 24 attached to bolt 18.

Torque is transmitted to the clutch body 10 through a shaft, represented schematically in FIG. 1 as a dashed line, which is drivingly connected to power source 28, which is, as explained above, contemplated to be the transmission of a truck. Also, although they have not been shown for clarity of the drawing, the shaft includes a splined section so the shaft could move axially and universal joints so that there could be relative movement between the power source 28 and pump 30, which is driven.

The drive disc 14 has attachment means for connecting the shaft to it and therefore, for transmitting torque into body 10. This means for connection includes threaded bolt holes 34.

Bore 32 extends through the drive disc 14 and that one end of the bolt 18 is telescoped within bushing 36 within the bore 32. The spring disc 16 is attached by capscrews 39 onto the other end of the cover 12.

Therefore, it may be seen that the body 10 is can shaped, specifically a right circular cylinder closed at each end. Bolt 18 extends through bushing 38 in the spring disc 16. In normal operation, there is no rotation between the bolt 18 and the body 10; however, in the event of overloading the clutch, the body 10 will rotate faster than the bolt 18. The bolt 18 and body 10 are maintained in alignment inasmuch as at spaced points, the bolt 18 fits in the bushing 36 in the drive disc 14 and the bushing 38 in the spring disc 16.

The outside end of the bolt 18 is coupled to pump shaft 41 by attachment means 40 for transmitting torque from the clutch into the pump 30. The attachment means 40 is like a head on the bolt 18. The serrated body plate 22 and serrated bolt plate 24 are telescoped over the bolt 18 between the spring disc 16 and the attachment means 40. Serrated plates 22 and 24 have radial serrations mated together so that the plates, biased together, transmit torque. However, if the torque to be transmitted exceeds a certain quanity, depending upon the force which the plates 22 and 24 are biased together, the angle of the serrations will cause them to move apart, the serrations being V-notched. If movement does occur, the serrations rubbing on one another will generate a raucous signal which will alert the operator that the clutch has been overloaded. The serrated plate 22 has pins 44 projecting from the back side. The serrated plate 24 has pins 46 projecting from the back side. The pins 44 project into mating holes upon the spring disc 16 so the serrated body plate 22 turns with the body 10. Likewise, pins 46 mate with holes in radial face 42 of attachment means 40 so that the serrated bolt plate 24 turns with the bolt 18.

As seen in the drawings, the bolt 18 is biased to the left and the body 10 to the right by compression spring 50, thus biasing the serrated plates 22 and 24 together. The force with which the serrrated plates are biased together depends upon the setting of the nut 20 inasmuch as the spring extends from the nut 20 to the spring disc 16. The nut 20 is held securely in place by setscrew 52. Washers 48 between the ends of the spring 50 and the nut 20 and the spring disc 16 permit smooth rotation.

Cover 12 has wrench hole 54 located therein over setscrew 52. Therefore, if it is desired to change the compression of the spring 50, the operator can remove the capscrews 39 by which the spring disc 16 is attached to cover 12 and insert a wrench through hole 54 into the setscrew 52. Preferable the setscrew 52 is an allen screw, meaning that it has a hexagonal cavity therein and the wrench used through wrench hole 54 is an allen wrench so that after the setscrew 52 is loosened, the nut 20 may be turned upon the bolt 18 and the wrench may also be used to rotate the nut 20 on bolt 18, the cover being rotated on the bolt. After a new setting is made and the desired compressional stress is placed upon the spring 50, the setscrew 52 is tightened so the nut 20 is tight on the bolt 18 and the spring disc 16 bolted to the cover 12 by the capscrews 39. The clutch is again ready for operation.

It will be noted that the nut 20 turns easily upon the bolt 18 inasmuch as the nut and threaded portion of the bolt 18 are contained within the closed "can" or cover 12 and therefore, are protected from being battered by small flying objects and, also, kept clean of mud and dirt. The adjustment may be made while the clutch is still attached between the pump 30 and the drive transmission 28. The adjustment is not so easily made that it is susceptible to tampering by the operators of the equipment.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim:
1. An overload clutch comprising:
 a. a can-shaped body having
  i. a tubular cover with
  ii. a driving disc at one end and
  iii. a spring disc at the other end,
  iv. attachment means on the driving disc for transmitting torque thereto;
 b. a serrated body plate attached to the body at the spring disc end thereof;
 c. a bolt
  i. coaxially telescoped within the body,
  ii. one end of the bolt journaled in a bore of the body at the driving end thereof, and
  iii. the other end of the bolt projecting from the spring disc end of the body,
  iv. attachment means at the projecting end of the bolt for transmitting torque therefrom,
 d. a serrated bolt plate attached to the bolt of the projecting end thereof;
 e. the serrations of the bolt plate mating the serrations of the body plate;
 f. a nut threaded on the bolt within the body;
 g. a compression spring extending from the spring disc to the nut, biasing the plates together;
 h. a setscrew in the nut on the bolt; and
 j. a hole in the tubular cover of the body over the nut so that a wrench may be inserted through the hole to loosen the set screw of the nut.
2. The invention as defined in claim 1 with the additional limitations of:
 k. the spring disc of the body being attached by cap screws to the tubular cover of the body.
3. The invention as defined in claim 2 with the additional limitations of:
 m. a washer between said compression spring and spring disc, and
 n. a washer between said compression spring and nut.